April 26, 1966  J. DOBLIN ET AL  3,247,773

CAMERA

Filed Nov. 1, 1963  5 Sheets-Sheet 1

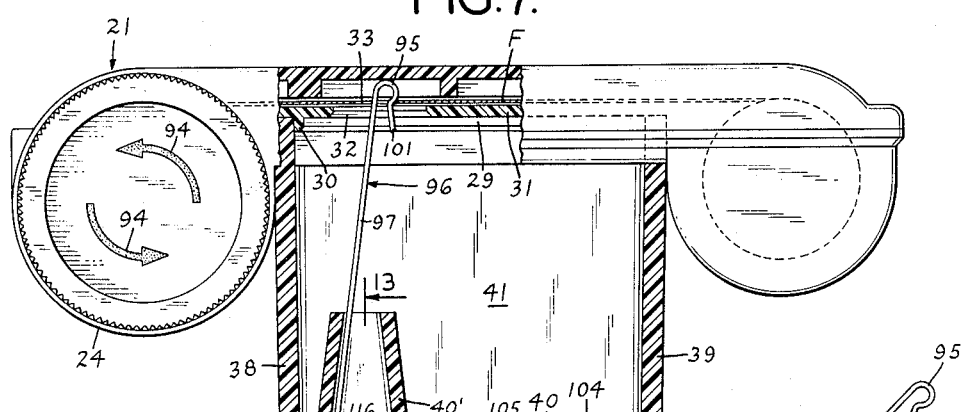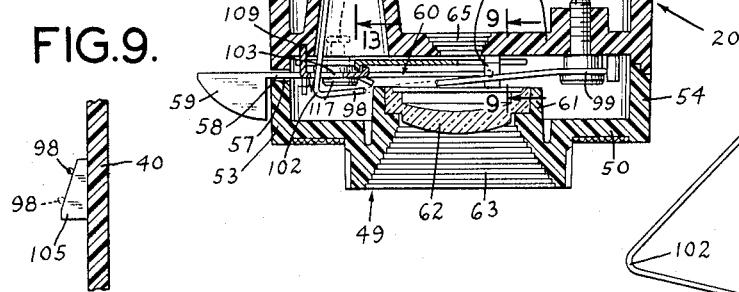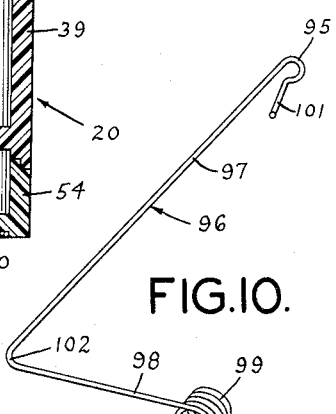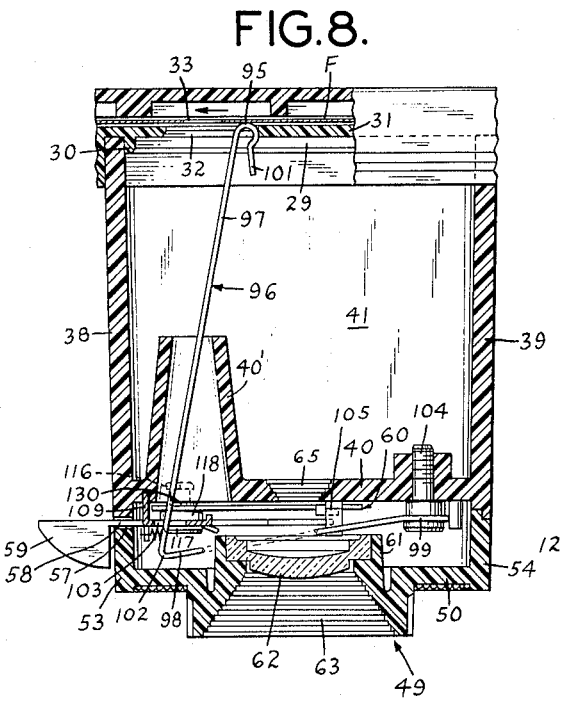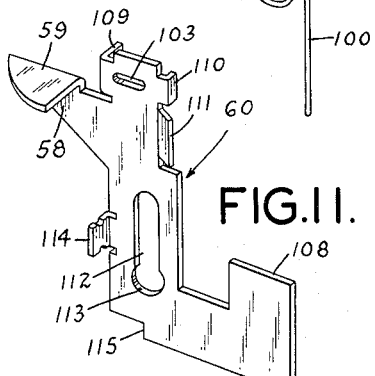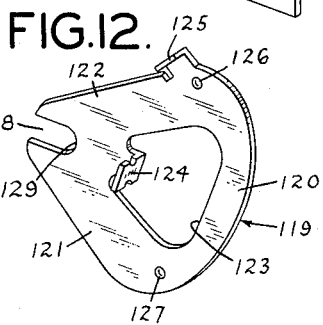

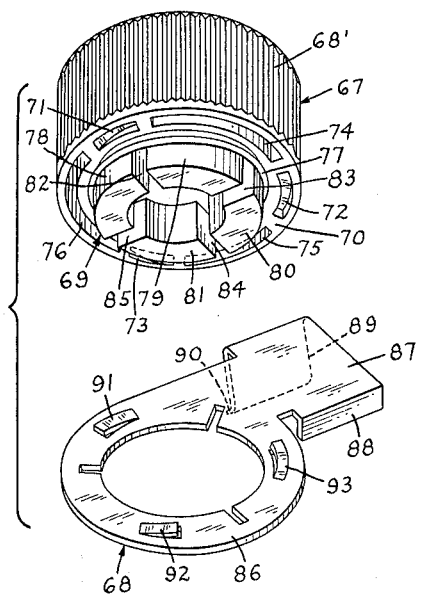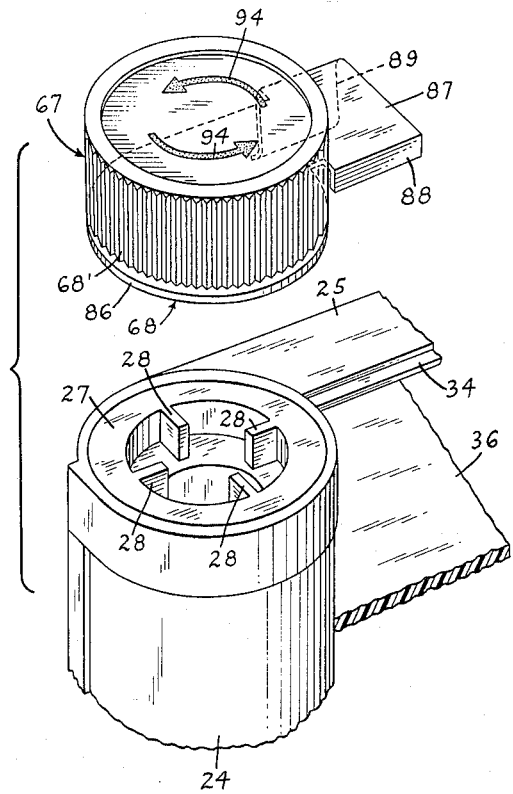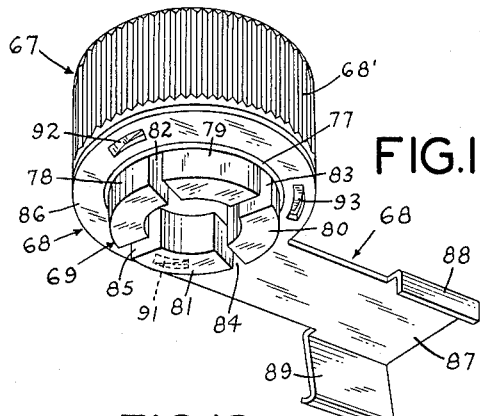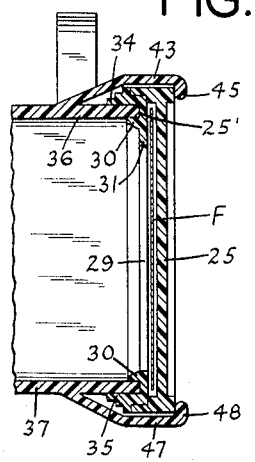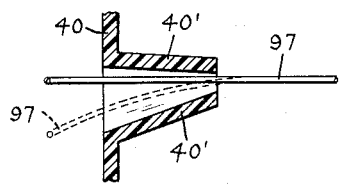

April 26, 1966 J. DOBLIN ET AL 3,247,773

CAMERA

Filed Nov. 1, 1963 5 Sheets-Sheet 5

United States Patent Office 3,247,773
Patented Apr. 26, 1966

3,247,773
CAMERA
Jay Doblin, Chicago, Ill., and Vinnie J. Rigolini, Brooklyn, N.Y., assignors to Whitehouse Products, Inc., Brooklyn, N.Y., a corporation of New York
Filed Nov. 1, 1963, Ser. No. 320,621
9 Claims. (Cl. 95—31)

The present invention relates to cameras and more particularly to cameras intended to be used with film cartridges or cassettes.

Film cartridges, for example, of the so-called size "126," have recently been placed on the market and have made available to amateur photographers film in a readily usable form which avoids the loading problems commonly encountered with roll film cameras. An example of such a film cartridge is found in United States Design Patent No. 195,746, issued July 23, 1963 to Hubert Nerwin. A roll film for the cartridge of the Nerwin design patent is illustrated in United States Patent No. 3,086,862, issued April 23, 1963 to Eagle et al. A typical cartridge construction and a typical camera construction for use therewith are illustrated in Belgian patent publication No. 626,595, corresponding to Nerwin United States patent application Serial No. 163,843 filed January 2, 1962.

The principal object of the present invention has been the provision of a novel and improved camera construction especially adapted for use with film cartridges.

Another object of the invention has been the provision of such a camera construction which is simple, inexpensive and reliable.

A further object of the invention has been the provision of a camera construction for use with film cartridges in which the cartridge itself forms a part of the camera housing.

Yet another object of the invention has been the provision of a camera construction for use with film cartridges in which the cartridge forms a part of the camera housing but is readily detachable from the camera body.

Still another object of the invention has been the provision of a camera construction for use with a film strip having metering perforations and in which film metering is accomplished efficiently with a minimum of parts.

Another object of the invention has been the provision of a novel and improved camera shutter mechanism.

Other and further objects, features and advantages of the invention will appear more fully from the following description taken in connection with the appended drawings, in which:

FIG. 7 is a plan view, partly in cross section, taken along the line 7—7 of FIG. 3;

FIG. 8 is a partial sectional view illustrating the shutter and film metering mechanisms of FIG. 7 in a different position;

FIG. 9 is a partial sectional view taken along the line 9—9 of FIG. 7;

FIG. 10 is a perspective detail view showing the metering rod;

FIG. 11 is a perspective detail view of the trip shutter blade;

FIG. 12 is a perspective detail view of the lower shutter blade;

FIG. 13 is a partial sectional view taken along the line 13—13 of FIG. 7;

FIG. 14 is a partial sectional view taken along the line 14—14 of FIG. 1;

FIG. 15 is an exploded perspective view of the film winding knob and ratchet spring;

FIG. 16 is a perspective view of the film winding knob and ratchet spring of FIG. 15 assembled;

FIG. 17 is an exploded perspective view of the assembled film winding knob and ratchet spring ready to be assembled to the film cartridge;

Figure 1:
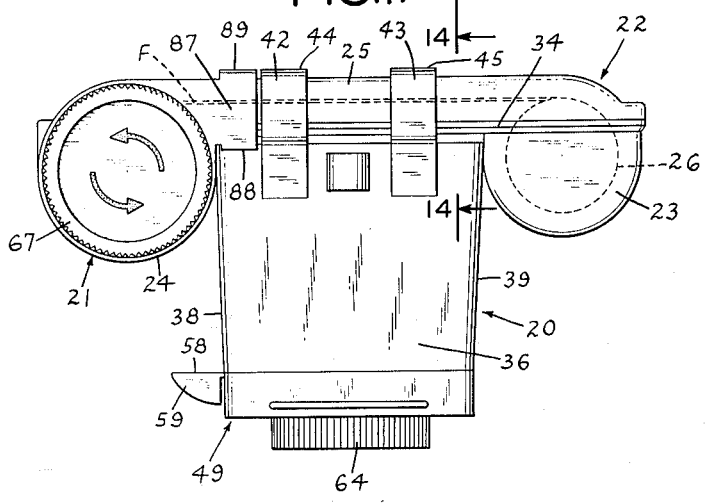
FIG. 1 is a top plan view of a camera embodying the invention.

The camera of the invention, as illustrated in FIGS. 1–17, comprises three principal separable components, these being a camera body 20, a film advancing mechanism 21, and a film cartridge 22. For convenience, the film cartridge 22 is illustrated as being essentially of the construction illustrated in the aforementioned Nerwin design patent, although it should be understood that other forms of cartridge construction could be used.

The cartridge 22 comprises a hollow cylindrical compartment 23 which is closed at both ends, a hollow cylindrical compartment 24 which is open at both ends, and a flat hollow body portion 25 interconnecting the cylinders 23 and 24. The cylinder 23 initially contains a roll of unexposed film, indicated by the reference numeral 26, having a leader which extends through the body portion 25 and into engagement with an annular take-up spool 27 contained in the compartment 24. The spool 27 is provided with radially inwardly extending fins 28 which are adapted to be contacted for rotating the spool 22 in a counterclockwise direction (FIG. 17) to advance the film F from the unexposed roll through the body portion 25 and onto the take-up spool 27.

The body portion 25 has an exposure window 29 facing the front of the camera, as best shown in FIG. 7, the window 29 being surrounded by a forwardly extending ridge 30. The terms forwardly, rearwardly, upwardly, downwardly, and similar terms used herein may be taken with reference to the camera disposed in the position shown in FIG. 1, which is a top plan view. For example, in FIG. 1 the cartridge 22 is at the rear of the camera and the film advancing mechanism 21 is at the top of the camera.

The window 29 is formed in the front wall 25' of the hollow body portion 25 and defines that portion of the film surface which will be exposed to light during the making of an exposure. A narrow strip 31 of the front wall 25' of the body portion 25 extends across the top of the window 29 and is included within the ridge 30. An elongated rectangular slot 32 is provided at the left (FIG. 7) side of strip 31 and is arranged to be aligned with metering slots provided in the film F at intervals corresponding to successive frames or exposure positions in the film, for example, as shown at 33 in FIG. 7. In this regard, the film strip may be made as shown in the aforementioned Eagle et al. patent and will have a light protective backing strip as shown in that patent.

As is best shown in FIGS. 7 and 8, the ridge 30 and the adjacent walls of compartments 23 and 24 each define a vertically disposed rectangular slot the base of which is the front face of body portion 25. The body portion 25 has forwardly extending flanges 34 and 35 at the top and bottom, respectively, thereof which define, with the horizontal portions of the ridge 30, horizontally disposed rectangular slots, as is best shown in FIG. 14. The horizontally and vertically disposed slots are joined and together form a socket arranged to receive and retain the rearward end of camera body 20.

Figure 2:
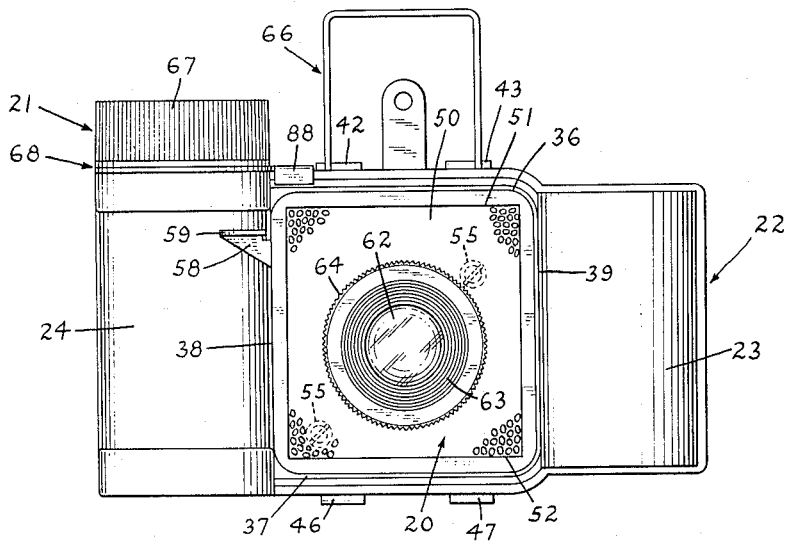
FIG. 2 is a front elevational view of the camera of FIG. 1.
Figure 3:
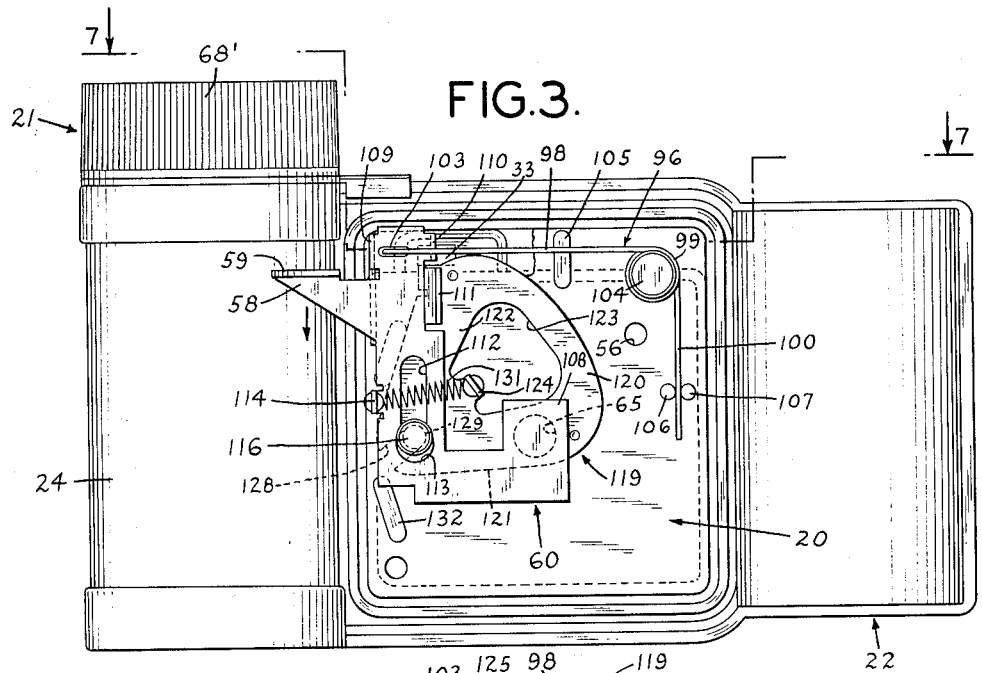
FIG. 3 is a front elevational view of the camera of FIG. 2 with the lens holder portion of the camera body removed.

The camera body 20 is provided with top, bottom, left side and right side walls 36, 37, 38 and 39, respectively, as shown in FIGS. 1–3, joined by a forward wall 40. The walls 36–40 may be integrally molded of a suitable plastic material. The walls 36–39 define a space 41 which is slightly larger in cross-sectional area at the open rear thereof than at the front thereof, the front being defined by the forward wall 40. The rear end of left side wall 38 extends into the slot formed between ridge 30 and the adjacent side wall of compartment 24. The rear end of right side wall 39 similarly extends into the slot formed between ridge 30 and the adjacent side wall of compartment 23. The rear end of top wall 36 extends into the slot formed between ridge 30 and flange 34, while the rear end of bottom wall 37 extends into the slot formed between ridge 30 and flange 35, as best shown in FIG. 14.

The fit of the camera body walls 36–39 into the cartridge socket, as described, may be tight. However, this fit is not relied on to retain the camera body and cartridge in assembled relation. For this purpose, the top wall 36 is provided with integral spaced lugs 42 and 43, which project rearwardly of the end of top wall 36 and have downwardly extending flanges 44 and 45 which engage the rear wall of cartridge body portion 25. Similarly, bottom wall 37 is provided with integral spaced lugs 46 and 47 having upwardly extending flanges, as shown at 48 in FIG. 14 for the lug 47, which engage the rear wall of cartridge body portion 25. When the camera body walls 36–39 are inserted in the cartridge sockets, the lugs 42, 43, 46 and 47 are automatically sprung so as to pass the cartridge top and bottom walls, and then the lugs spring inwardly when their flanges clear the cartridge top and bottom walls, thereby holding the camera body 20 and cartridge 21 in assembled relationship. However, the camera body 20 can easily be separated from the cartridge 21 by manually grasping the camera body and cartridge and pulling them apart.

The camera body 20 also comprises a lens housing 49 having a front wall 50, top and bottom walls 51 and 52, and left and right side walls 53 and 54. The walls 50–54 may be integrally molded from a suitable plastic material. The lens housing 49 is held assembled to the remainder of the camera body 20 by screws 55 extending through front wall 50 and acting in threaded holes 56 in forward wall 40. The walls 51–54 contact and form extensions of walls 36–39, respectively, except that a space 57 is left between portions of walls 53 and 38 to accommodate arm 58 of a shutter operating lever 59 which is formed as an integral part of a trip shutter blade 60, the construction of which is best shown in FIG. 11.

Front wall 50 is provided with a rearwardly extending annular flange 61 in which is mounted a lens 62. The lens 62 is aligned with a tapered light-admitting opening 63 in front wall 50, a portion of which opening is formed in an annular forwardly extending flange 64. Another tapered opening 65 is formed in forward wall 40 and is aligned with lens 62 and opening 63 to serve as the aperture. Lens 62 and aperture 65 are positioned so that the image of the scene in front of the camera is focused on the film F contained in window 29 when the shutter mechanism is operated. A suitable view finder may be mounted on or integrally formed in the camera body top, for example, as shown at 66 in FIG. 2.

The film advancing mechanism 21 comprises a winding knob 67 and ratchet spring member 68. The knob 67 is formed with a cylindrical knurled upper portion 68' and a reduced diameter annular cylindrical portion 69 projecting downwardly from the base of upper portion 68. The knob 67 is hollow except for a closed top. The base of upper portion 68' between the outer periphery thereof and cylindrical portion 69 is formed as a flat annular shoulder 70 having three short arcuate spaced slots 71, 72 and 73 separated by three long arcuate spaced slots 74, 75 and 76, respectively. The tops of slots 71–73 are inclined so as to be deepest at the clockwise end (FIG. 15) of each slot. The slots 74–76 are provided for lighting. Cylindrical portion 69 is provided with an annular outwardly extending bead 77 located below the shoulder 70.

The cylindrical portion 69 beneath bead 77 is divided into cylindrical segments 78, 79, 80 and 81 by vertically extending, open-ended slots 82, 83, 84 and 85, respectively. The slots 82–85 are adapted to accommodate respective fins 28 of spool 27 and segments 78–81 are adapted to be accommodated between the respective fins 28 when the film advancing mechanism is assembled to the camera as indicated in FIG. 17 and as shown in FIG. 2.

Ratchet member 68 has a flat annular disk portion 86 from one side of which projects a flat arm 87 having a short depending flange 88 at the front edge thereof and a longer depending flange 89 at the rear edge thereof. The bottom of flange 89 is bowed rearwardly, as shown at 90, to provide a spring action. The annular disk portion 86 is adapted to fit over the cylindrical portion 68' of knob 67 and, in assembly, is forced over bead 77 so as to be held against shoulder 70 by bead 77.

Disk 86 is provided with arcuate, inclined ratchet teeth 91, 92 and 93, which may be struck from the disk surface. The teeth 91–93 are adapted to fit into slots 71, 72 and 73, as shown in FIG. 16. The elevated ends of the teeth 91–93 are located at the counterclockwise ends (FIG. 15) thereof so as to face the deep ends of the slots 71–73. When the knurled knob 67 is rotated in a counterclockwise direction, as shown by the embossed arrows 94 in FIG. 17, the knob may be rotated relative to ratchet spring 68 because teeth 91–93 will be forced downwardly out of contact with the walls of slots 71–73. However, reverse rotation of the knob 67 (clockwise in FIG. 17) is prevented since the elevated ends of the teeth 91–93 will contact the deep ends of the corresponding slots 71–73 and prevent such rotation.

The knob 67 and ratchet spring 68, assembled as shown in FIG. 16, is adapted to be mounted on the cartridge 22 by placing the knob 67 directly over the spool 27 with slots 82–84 each aligned with a respective fin 28 and with arm 87 overlying the top of cartridge 22. Flanges 88 and 89 contact the front and rear walls, respectively, of cartridge 22 and, by spring action serve to retain winding mechanism 21 assembled to cartridge 22.

Rotation of knob 68 in a counterclockwise direction acts to rotate spool 27 and thus to advance film from roll 26 past window 29 and onto spool 27. When all of the exposures have been taken, the winding mechanism 21 may be removed from cartridge 22 by pulling against the spring action and is ready to be installed on another cartridge. Similarly, the camera body 20 may be removed from a spent cartridge for installation on another cartridge.

When it is desired to prepare the camera for picture taking, the camera body 20 and winding mechanism 21 are each snapped into place on the cartridge 22, as described above. It is immaterial which is first snapped into position.

When the camera is initially assembled, rounded end 95 of a film metering spring 96 is contacting film F at the right end of slot 32, as shown in FIG. 8. As best shown in FIGS. 7, 8 and 10, metering spring 96 is formed from a length of spring wire having rounded end 95, a long straight leg 97, a short straight leg 98, a coil portion 99 and a straight end leg 100. Rounded end 95 of spring 96 terminates in a short offset leg 101. The legs 97 and 98 lie in a common plane and are joined by a short radius curve 102. The angle between legs 97 and 98 is slightly less than 90°, and typically might be 72°. Leg 100 lies in a plane at right angles to the plane of legs 97 and 98 and lies at a right angle with respect to leg 98. The relationship of the legs referred to above is for an unstressed condition of the spring 96. The spring 96 might, for example, be made from 0.018″ diameter music wire.

Figure 4:
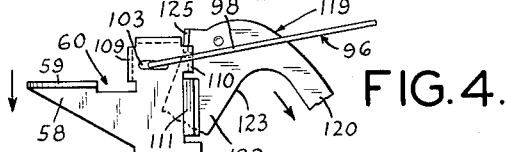
FIG. 4 is a fragmentary detail view of a portion of the shutter and film metering mechanisms.

Leg 97 extends through a hollow truncated conical extension 40′ of wall 40 and through a narrow elongated slot 103 of trip shutter blade 60. The coil portion 99 is mounted on a stud 104 which is threadably secured to a hole in forward wall 40. Leg 98 lies against an inclined rib 105 which projects forwardly from forward wall 40. Leg 100 is held between two pins 106 and 107 which project forwardly from wall 40 beneath stud 104, as shown in FIG. 4.

As best shown in FIG. 11, trip shutter blade 60 is generally flat and L-shaped with arm 58 projecting from the vertical body of the L. A projection 108 extends upwardly from the base of the L. The slot 103 is horizontally disposed near the top of the L. Rearwardly extending tabs 109 and 110 are provided at opposite sides of the top of the L. A tab 111 extends forwardly at an angle beneath tab 110 on the inner side of the L body. A vertically disposed narrow elongated slot 112 is provided at the lower end of the L body, the slot 112 having an enlarged rounded end 113 at the bottom. A forwardly extending tab 114 is provided at the outer side of the L body opposite slot 112. A notch 115 is provided at the base of the L body.

A stud 116 is mounted in forward wall 40 and extends forwardly. Stud 116 has a head 117 and an annular flange 118 spaced therefrom to provide therebetween a bearing surface for the walls of elongated slot 112. Stud 116 thus supports strip shutter blade 60 for vertical movement between the upper position shown in FIG. 3 and the lower position shown in FIG. 6.

A lower shutter blade 119 is shown in FIG. 12 and is flat with a rounded head 120 and two side legs 121 and 122, forming a generally triangular shape. A similarly shaped opening 123 is provided in blade 120. A forwardly extending tab 124 is provided at the narrow end of opening 123. Another forwardly extending tab 125 is provided at the juncture of head 120 and top side 122. A pair of rearwardly extending dimples 126 and 127 are provided adjacent the ends of head 120 to facilitate relative sliding motion between blade 119 and forward wall 40. An elongated notch 128 having a rounded closed end 129 is provided at the juncture of sides 121 and 122.

Notch 128 fits over stud 116 between flange 118 and an annular flange 130. Stud 116 thus serves to support lower shutter blade 119 for pivoting motion between the upper position thereof shown in FIG. 3 and the lower position thereof shown in FIG. 6.

A coil spring 131 is affixed at one end to tab 114 of trip shutter blade 60 and at the other end thereof to tab 124 of lower shutter blade 119.

As mentioned above, when the camera is initially assembled, rounded end 95 of film metering spring 96 contacts film F at the right end of slot 32. In this position of spring 96 it is tensioned to urge end 95 to the right and to the rear (FIG. 8). In order to position the first frame in window 29, winding knob 68′ is rotated in a counterclockwise direction (FIG. 17), advancing film F from right to left (FIG. 8). When the film metering slot 33 associated with the first frame passes the right edge of slot 32, end 95 of metering spring 96 enters the slot 33 and is carried toward the left by and with the film, as shown in FIG. 7. When leg 97 of metering spring 96 contacts the left side wall of conical extension 40′, as shown in FIG. 8, further movement of leg 97 toward the left is prevented. Rounded end 95 can thus not be moved further to the left, and contact between rounded end 95 and slot 33 prevents further advance of film F and further rotation of knob 68. At this point film F will be positioned properly relative to window 29 for the first exposure. The shutter blades 60 and 119 and spring 131 will be in their normal or rest positions, as shown in FIG. 3, and the shutter mechanism will be ready to expose the film.

To make the exposure, the photographer pushes down on lever 59, as with the thumb or a finger, forcing trip shutter blade 60 to move downwardly from the FIG. 3 position to the FIG. 4 position thereof. The downward motion of the trip shutter blade 60 is guided by contact between the walls of slot 112 and stud 116. Additional guidance is afforded by tab 109 which slides in a vertical slot provided in forward wall 40, and by contact between shutter blade 60 and a boss 132 which projects forwardly from wall 40. The boss 132 principally serves as a stop for lower shutter blade 119, as shown in FIG. 6, and also acts to prevent cocking or tilting of blade 60. As the blade 60 descends, spring 131 is brought into tension and exerts an off-center pull on lower shutter blade 119, tending to pull the latter downward. However, lower shutter blade 119 cannot move until tab 125 on blade 119 clears tab 110 on blade 60. The tabs 110 and 125 are shown prior to disengagement in FIG. 4 and completely disengaged in FIG. 5.

Figure 5:
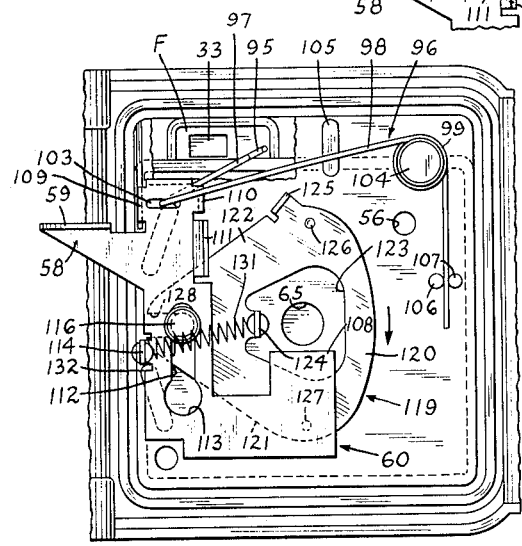
FIG. 5 is a partial front elevational view illustrating the shutter mechanism of FIG. 3 in an intermediate position.
Figure 6:
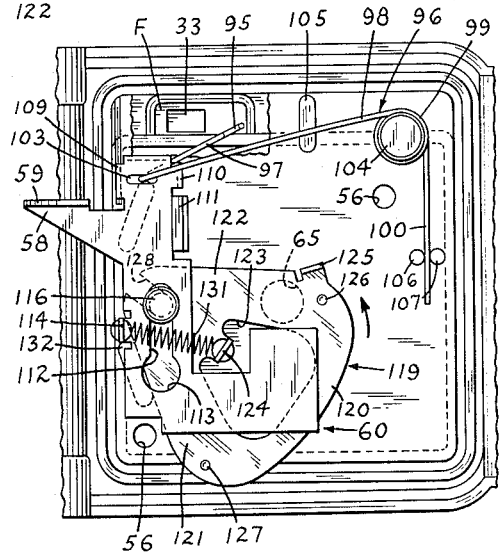
FIG. 6 is a partial front elevational view illustrating the shutter mechanism of FIG. 3 in still another position.

As soon as tab 125 clears tab 110, spring 131 causes blade 119 to pivot in a clockwise direction about stud 116 from the position shown in FIG. 3, through the intermediate position shown in FIG. 5, and to a final position shown in FIG. 6. With the shutter blades 60 and 119 in the FIG. 6 positions thereof, spring 131 will again be at its normal tension, as in the FIG. 3 positions of the shutter blades.

As the trip shutter 60 is moved downward by operating force exerted on lever 59, the top wall of slot 103 contacts leg 97 of metering spring 96 and forces the leg 97 to move downwardly, in turn forcing leg 98 to pivot downwardly. However, leg 98 moves over inclined rib 105 which causes leg 98 and also leg 97 to move outwardly. This motion of leg 98 along rib 105 is shown in FIG. 9, where the dotted line position of leg 98 is that achieved when trip shutter 60 is in its lowest position. The dotted line position of leg 97 in FIG. 13 corresponds to a lowermost position of blade 60. The outward motion of leg 97 causes rounded end 95 of metering spring 96 to withdraw from film slot 33. When rounded end 95 is clear of film slot 33, the sideward tension on leg 97 causes leg 97 and rounded end 95 to move to the right, the rounded end 95 lying against the surface of the film. The motion of rounded end 95 to the right is stopped when rounded end 95 contacts the right-hand edge of slot 32, as shown in FIG. 8. As soon as rounded end 95 is clear of slot 33, the winding knob 68′ is again free to be turned to advance the film F.

In the normal or rest positions (FIG. 3) of shutter blades 60 and 119, projection 108 of blade 60 and side 121 of blade 119 both overlie aperture 65 and prevent light from entering aperture 65. As blade 60 starts to move downward, projection 108 likewise moves downward. However, aperture 65 is not uncovered until blade 119 is released and, in pivoting, aligns opening 123 with aperture 65. Thus, as shown in FIG. 5, with blade 60 in its lowest position and blade 119 in its intermediate position, aperture 65 is uncovered and light entering lens 62 passes over projection 108, through opening 123, through aperture 65, through space 41, and through window 29 onto film F, resulting in the desired exposure. As soon as opening 123 falls below the level of aperture 65, side 122 of blade 119 covers aperture 65 and stops the exposure. The motion of lower shutter blade 119 is controlled by spring 131 and hence its speed, and thus also the exposure time, are independent of the speed of descent of trip shutter blade 60.

When operating lever 59 is released, the tension in coil portion 99 imparted thereto by the downward motion of legs 97 and 98 urges leg 98 to pivot upwardly and leg 97 to move upwardly, carrying trip shutter blade 60 back to its rest (FIG. 3) position.

As trip shutter blade 60 moves upwardly, spring 131 is tensioned, causing lower shutter blade 119 to pivot in a counterclockwise direction, as shown by the arrow in FIG. 6, back to its FIG. 3 position. In the return motion of the shutter blades, projection 108 will cover aperture 65 before opening 123 is in a position to uncover the aperture. Hence, light will not be permitted to enter the aperture during the return motion of the shutter blades. Since there may be some stop between blades 60 and 119, inclined tab 111 is provided on blade 60 to engage tab 125 on blade 119 during return motion of the latter. Contact between tab 125 and the rear surface of tab 111 prevents tab 125 from becoming caught on the side edge of the main leg of blade 60.

With the shutter blades back in their normal or rest positions, the film may be advanced to the next frame, arrival at which will be apparent to the photographer by the locking action resulting after rounded end 95 enters the slot 33 in film F corresponding to the next frame, and when leg 97 contacts the side wall of extension 40'. The next exposure may then be made and the cycle repeated until all exposures have been made. The camera body 20 and film winding mechanism 21 may then be removed from cartridge 22 and installed on a new cartridge.

The camera body 20 is especially adapted for use in organization in which the film cartridge forms a part of the camera housing. However, the camera body, including the shutter mechanism and film metering mechanism described, may be used in a more conventional organization in which the camera body forms a part of a housing adapted to receive and enclose the film cartridge. Such an organization is illustrated, for example, in the aforementioned Belgian patent publication.

A modified form of film metering and shutter mechanism according to the invention is illustrated in FIGS. 18–24. The camera construction and organization are basically similar to those previously described, and like reference numerals are used to denote like elements. The principal changes are in the film metering operation. Thus, the metering spring 96 is replaced with a metering rod 200 having a head 201 at one end and having a free end designated 202 which is adapted to enter the metering opening 33 in film F.

The trip shutter blade 60' differs from blade 60 principally in the omission of slot 103, a minor change in the shape of projection 108, designated 108', a change in the shape (but not in the function) of inclined tab 111 (designated 111'), the provision of a notched tab 203, the provision of an upwardly extending projection 204 terminating in a forwardly inclined tab 205 having a rounded end 206, and the provision of an open-ended notch 207 between tab 110 and projection 204. Spring-engaging tab 114' is located further up on blade 60' than corresponding tab 114, resulting in a spring 131' being shorter than spring 131.

Lower shutter blade 119' differs principally from blade 119 in that rounded end 120 is replaced with a straight end 120'. However, operation of the shutter blades in the making of an exposure is essentially the same as described previously.

Figure 18:
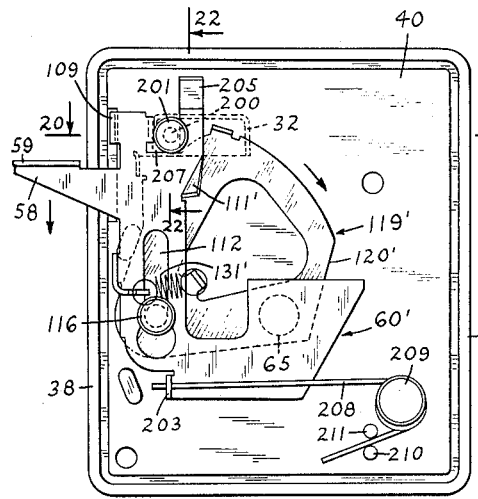
FIG. 18 is a partial front elevational view similar to FIG. 3 illustrating a modified film metering and shutter mechanism embodying the invention.
Figure 19:
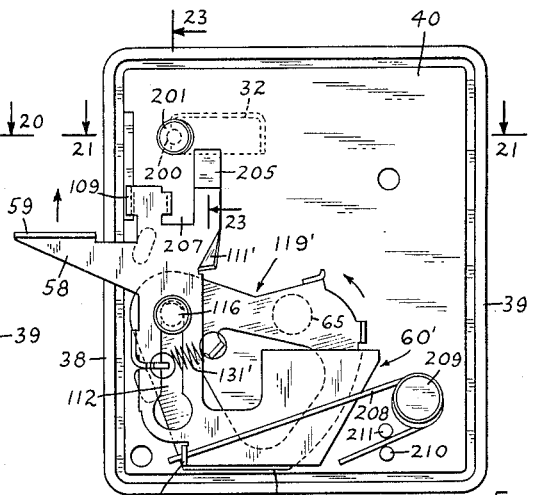
FIG. 19 is a partial front elevational view illustrating the mechanism of FIG. 18 in a different position.

The shutter blades before exposure are shown in FIG. 18. The blades in their final positions after exposure are shown in FIG. 19. A spring 208 having one end engaged in the notch in tab 203, a coil portion wrapped about stud 209 and the other end held by pins 210 and 211, is tensioned as the trip shutter blade 60' is manually moved from the FIG. 18 to the FIG. 19 position thereof. When the trip shutter blade 60' is released, spring 208 returns blade 60' to its rest (FIG. 18) position. As blade 60' moves upward, spring 131' causes lower shutter blade 119' to follow. Inclined tab 111' serves to keep blade 119' behind the blade 60'.

Figure 20:
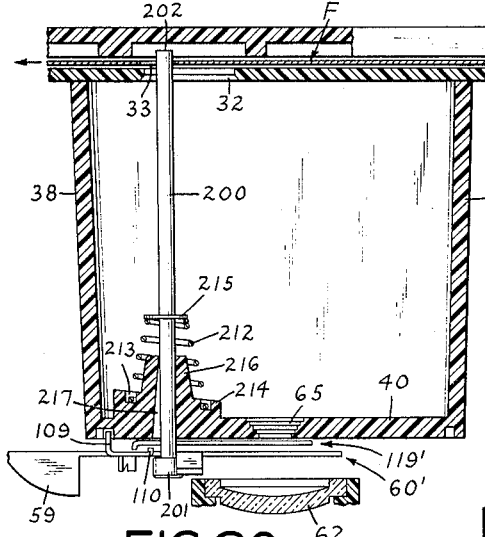
FIG. 20 is a partial cross-sectional view taken along the line 20—20 of FIG. 18.

Metering rod 200 extends through open-ended notch 207 and the inner annular surface of head 201 rests against projection 204 in the normal or rest position of the trip shutter blade 60', as shown in FIGS. 18, 19 and 20. The free end 202 of rod 200 is urged rearwardly into engagement with film F and to the right by a cone spring 212. The large diameter base of spring 212 lies in a slot 213 provided in an inclined boss 214. The small diameter end of cone spring 212 contacts a retaining washer 215 which is affixed to rod 200. The rearward and rightward urging of free end 202 of rod 200 referred to is a result of compression of spring 212 and the tilt imparted thereto by the inclination of boss 214.

A conical extension 216 on boss 214 acts as a retainer for spring 212. A tapered slot 217 in extension 216, boss 214 and forward wall 40 accommodates rod 200 and permits rod 200 to pivot about the upper end of slot 217 so that the free end 202 can move between the positions shown in FIGS. 20 and 21.

Figure 21:
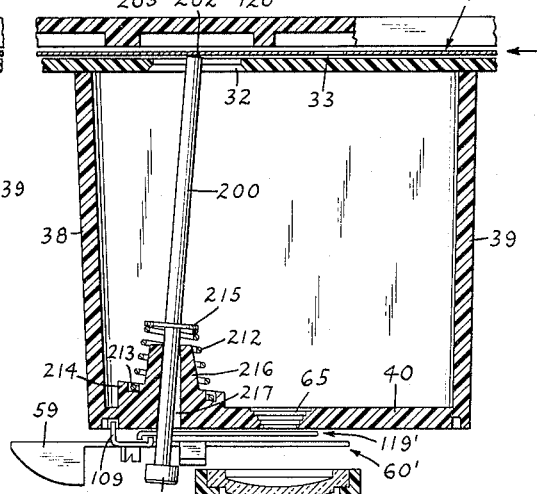
FIG. 21 is a partial cross-sectional view taken along the line 21—21 of FIG. 19.

When trip shutter blade 60' is moved downwardly during the taking of an exposure, inclined tab 205 contacts the inner annular surface of head 201 and forces rod 200 to move forwardly, compressing spring 212. Forward movement of rod 200 causes free end 202 to be withdrawn from film metering opening 33, allowing spring 212 to move free end 202 toward the right (FIGS. 20 and 21) until stopped by contact of rod 200 with the left side wall of slot 217, as shown in FIG. 21. Rod 200 will remain in the FIG. 21 position when trip shutter blade 60' is released because free end 202 will be contacting an unbroken film surface.

However, when the film F is advanced, a metering opening 33 corresponding to the next frame will ultimately become aligned with free end 202 and spring 212 will force free end 202 forwardly into the slot 33. As film F continues to advance, free end 202 will pivot toward the left with the film and against the rightward urging of spring 212. When rod 200 contacts the right side of slot 217, as shown in FIG. 20, further motion of free end 202 toward the left is stopped and hence further advance of the film is stopped. When trip shutter blade 60' is moved to make another exposure, rod 200 moves forwardly and to the right, as described previously, freeing the film for further advance to the next frame.

Figure 22:
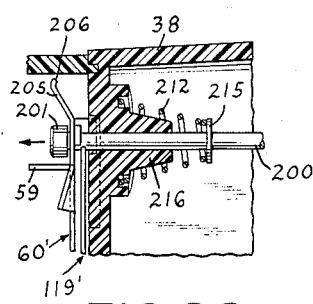
FIG. 22 is a partial cross-sectional view taken generally along the line 22—22 of FIG. 18.
Figure 23:
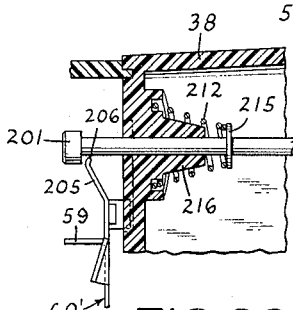
FIG. 23 is a partial cross-sectional view taken generally along the line 23—23 of FIG. 19.
Figure 24:
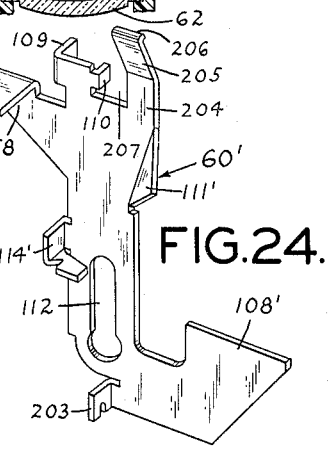
FIG. 24 is a perspective view of the trip shutter blade of FIG. 18.

As will be evident from FIGS. 22 and 23, slot 217 confines rod 200 in a vertical direction so that only the horizontal pivoting shown in FIGS. 20 and 21 is permitted.

While the invention has been described in connection with specific embodiments thereof and in specific uses, various modifications thereof will occur to those skilled in the art without departing from the spirit and scope of the invention as set forth in the appended claims.

What is claimed is:

1. A photographic camera mechanism for use with a roll film cartridge having a film chamber, a take-up chamber, a rotatable take-up spool in said take-up chamber, a cartridge body interconnecting said film and take-up chambers, a roll of film in said film chamber, said film having a leader portion extending through said cartridge body and into operative contact with said spool whereby rotation of said spool in one direction draws film from said roll and advances the same through said cartridge body and onto said spool, said film having a plurality of axially elongated metering openings each positioned in substantially identical predetermined relation to a respective frame area of said film, said cartridge body having a light-admitting window in the front side thereof positioned relative to said film so that successive frame areas may be aligned with said window as said film is advanced, said front side of said cartridge body having a metering slot having an axial length greater than that of said metering openings and being arranged to be aligned with the metering opening corresponding to each frame area when the latter is aligned with said window, and a socket formation in said front side of said cartridge body surrounding said window; said mechanism comprising:

(a) a camera body having:
  (1) a front wall;
  (2) a top wall, a bottom wall and a pair of side walls each contacting said front wall and defining, at the rear ends thereof, an open end of said camera body, said open end being insertable in said socket formation in light-tight relationship;
  (3) latching means projecting outwardly from an opposite pair of said walls defining said open end and extending rearwardly beyond said open end, said latching means overlying and contacting said cartridge body when said open end is inserted in said socket thereby to releasably retain said camera body assembled to said cartridge body and with said open end aligned with said window;
  (4) a lens mounted in said front wall;
  (5) a shutter mechanism mounted in said camera body and being arranged, except in an exposure position thereof, to prevent light entering said lens from reaching said window;
  (6) an externally actuable member connected to said shutter mechanism for moving the latter through said exposure position thereof thereby to admit light through said lens and through said window to make an exposure;
  (7) a metering rod connected to said shutter mechanism and having an end entering said metering slot and arranged to enter said metering openings in said film when said metering openings are aligned with said metering slot, said rod being movable by and with said film by contact of the sides of a metering opening with said rod;
  (8) stop means to prevent further motion of said rod by said film when a frame is positioned in alignment with said window thereby also to prevent further advance of said film; and
  (9) means to withdraw said rod from said metering opening upon actuation of said shutter mechanism thereby to release said film for further advance; and (b) a separate film winding mechanism having:
  (1) a rotatable knob having spool engaging means projecting from one end thereof; and
  (2) means to releasably attach said rotatable knob to said cartridge body with said spool engaging means operatively connected to said spool whereby rotation of said knob in one direction advances said film.

2. A photographic camera mechanism for use with a roll film cartridge having a film chamber, a take-up chamber, a rotatable take-up spool in said take-up chamber, a cartridge body interconnecting said film and take-up chambers, a roll of film in said film chamber, said film having a leader portion extending through said cartridge body and into operative contact with said spool whereby rotation of said spool in one direction draws film from said roll and advances the same through said cartridge body and onto said spool, said film having a plurality of axially elongated metering openings each positioned in substantially identical predetermined relation to a respective frame area of said film, said cartridge body having a light-admitting window in the front side thereof positioned relative to said film so that successive frame areas may be aligned with said window as said film is advanced, said front side of said cartridge body having a metering slot having an axial length greater than that of said metering openings and being arranged to be aligned with the metering opening corresponding to each frame area when the latter is aligned with said window; said mechanism comprising a camera body having:

(1) a front wall and an intermediate wall spaced from and parallel to said front wall;
(2) a top wall, a bottom wall and a pair of side walls, said walls each contacting said front and intermediate walls and defining, at the rear ends thereof, an open end of said camera body, said open end being insertable in said socket formation in light-tight relationship and with said window aligned with said open end;
(3) a lens mounted in said front wall, said intermediate wall having a light-admitting aperture aligned with said lens and said open end;
(4) a shutter mechanism mounted on said intermediate wall, said shutter mechanism comprising a trip shutter blade movable vertically from a rest position to an end position thereof, a lower shutter blade pivotally movable from a rest position, through an exposure position and to an end position thereof, said lower shutter blade having a light admitting opening arranged to be aligned with said aperture and said window when said lower shutter blade is in said exposure position thereof, spring means interconnecting said blades and arranged to cause said lower shutter blade to pivot between said rest and end position thereof when said trip shutter blade moves between said positions thereof, said trip shutter blade having a narrow enclosed opening, said blades having cooperating masking configurations preventing light entering said lens from reaching said aperture except as said lower shutter blade is passing through said exposure position thereof toward said end position thereof;
(5) an externally actuable member connected to said trip shutter blade for moving the latter from said rest position to said end position thereof thereby to admit light through said lens and said aperture and through said window to make an exposure;
(6) an elongated metering rod extending through said opening in said trip shutter blade and having an end entering said metering slot and arranged to enter said metering openings in said film when said metering openings become aligned with said metering slot, said rod being movable by and with said film by contact of the sides of a metering opening with said rod;
(7) stop means to prevent further motion of said rod by said film when a frame is positioned in alignment with said window thereby also to prevent further advance of said film; and
(8) means to withdraw said rod from said metering opening upon actuation of said shutter mechanism thereby to release said film for further advance, said last mentioned means comprising the walls of said opening in said trip shutter blade and a cam surface projecting in the path of said metering rod and arranged to force said metering rod out of said metering opening as said metering rod is forced to move by contact with the walls of said opening in said trip shutter blade.

3. In a photographic camera for use with a roll film containing cartridge having a light admitting window in one side thereof positioned relative to said film so that successive frame areas may be aligned with said window as said film is advanced in said cartridge, said film having a plurality of axially elongated metering openings each positioned in substantially identical predetermined relation to a respective frame area of said film, said one side of said cartridge having a metering slot having an axial length greater than that of said metering openings and being aligned with the metering opening corresponding to each frame area when the latter is aligned with said window, said camera having a camera body with a lens positioned to admit light to said window to make an exposure; a combined shutter and film metering mechanism comprising:

(a) a stud anchored to said camera body;
(b) an upper shutter blade having an elongated slot encompassing said stud, said upper shutter blade being movable in a linear transverse direction, relative to light entering said lens, between a rest position and a final position, said upper shutter blade having a narrow enclosed slot;
(c) a lower shutter blade pivotally movable about said stud from a rest position through an exposure position to a final position, said shutter blades having cooperating masking configurations arranged to prevent light entering said lens from reaching said window except when said lower shutter blade is traversing said exposure position thereof while passing from said rest to said final position thereof;
(d) externally operable means for moving said upper shutter blade from said rest to said final position thereof;
(e) spring means interconnecting said shutter blades and urging said lower shutter blade to move between said rest and final positions thereof as said upper shutter blade moves between the corresponding positions thereof;
(f) means comprising interengaging tabs in said upper and lower shutter blades to delay motion of said lower shutter blade from said rest position thereof until said upper shutter blade has moved at least a major portion of the distance from said rest to said final positions thereof;
(g) a wire metering spring having a first leg extending through said enclosed slot and having a free end extending into said metering slot, a coil portion anchored to said camera body and a second leg interconnecting said first leg and said coil portion, said metering spring being biased to urge said free end into a normal position in engagement with said film and contacting the side of said metering slot from which said film advances whereby said free end enters a metering opening in said film when said metering opening becomes aligned with said metering slot, further advance of said film moving said first leg with said film and against said bias;
(h) stop means positioned in the path of motion of said first leg with said film and arranged to stop said motion of said free end with said film and thereby stop advance of said film when a frame area corresponding to said metering opening is aligned with said window; and
(i) a fixed cam surface on said camera body arranged to contact said second leg and to move said second leg in a direction to withdraw said free end from said metering opening when said upper shutter blade is moved to said final position thereof, said motion of said upper shutter blade from said rest to said final position thereof causing the walls of said enclosed slot in said upper shutter blade to urge said first leg in a direction causing said second leg to traverse said cam surface, said free end returning to said normal position thereof when withdrawn from said metering opening, said metering spring being tensioned by said motion of said upper shutter blade to said final position thereof to return said upper shutter blade and thereby also said lower shutter blade to said rest positions thereof when said externally operable means is released.

4. A combined shutter and film metering mechanism as set forth in claim 3 in which said free end of said metering spring has a rounded end and in which said upper shutter blade has an inclined tab arranged to contact said lower shutter blade as the latter returns from said rest to said final positions thereof, said contact of said lower shutter blade and said inclined tab preventing locking of said shutter blades.

5. In a photographic camera for use with a roll film containing cartridge having a light admitting window in one side thereof positioned relative to said film so that successive frame areas may be aligned with said window as said film is advanced in said cartridge, said film having a plurality of axially elongated metering openings each positioned in substantially identical predetermined relation to a respective frame area of said film, said one side of said cartridge having a metering slot having an axial length greater than that of said metering openings and being aligned with the metering opening corresponding to each frame area when the latter is aligned with said window, said camera having a camera body with a lens positioned to admit light to said window to make an exposure; a combined shutter and film metering mechanism comprising:

(a) an upper shutter blade movable in a linear transverse direction, relative to light entering said lens, between a rest position and a final position, said upper shutter blade having a narrow open-ended enclosed slot at one end thereof;
(b) a lower shutter blade pivotally movable from a rest position through an exposure position to a final position, said shutter blades having cooperating masking configurations arranged to prevent light entering said lens from reaching said window except when said lower shutter blade is traversing said exposure position thereof while passing from said rest to said final position thereof;
(c) externally operable means for moving said upper shutter blade from said rest to said final position thereof;
(d) spring means interconnecting said shutter blades and urging said lower shutter blade to move between said rest and final positions thereof as said upper shutter blade moves between the corresponding positions thereof;
(e) means to delay motion of said lower shutter blade from said rest position thereof until said upper shutter blade has moved at least a major portion of the distance from said rest to said final positions thereof;
(f) a metering rod extending through said open-ended slot, said rod having a free end and having an enlarged head at the other end thereof, said free end extending into said metering slot;
(g) spring biasing means contacting said metering rod and urging said free end into a normal position in engagement with said film and adjacent the side of said metering slot from which said film advances whereby said free end enters a metering opening in said film when said metering opening becomes aligned with said metering slot, further advance of said film moving said free end with said film and against the force of said spring biasing means;
(h) first stop means positioned in the path of motion of said rod with said film and arranged to stop said motion of said rod with said film and thereby to stop advance of said film when a frame area corresponding to said metering opening is aligned with said window;
(i) second stop means positioned in the path of motion of said rod and arranged to stop said motion of said rod in said normal position thereof;

(j) means comprising an inclined tab on said upper shutter blade arranged to contact said head on said metering rod and to move said metering rod in a direction to withdraw said free end from said metering opening as said upper shutter blade is moved toward said final position thereof thereby to free said metering rod to return said free end to said normal position thereof; and (k) a spring element arranged to be tensioned by said motion of said upper shutter blade to said final position thereof whereby said spring element returns said upper shutter blade and thereby also said lower shutter blade to said rest position thereof when said externally operable means is released.

6. A combined shutter and film metering mechanism as set forth in claim 5 in which said spring biasing means comprises a conical spring element anchored at the large diameter end thereof to said camera body and anchored at the small diameter end thereof to an intermediate point on said metering rod.

7. A combined shutter and film metering mechanism as set forth in claim 6 comprising a support surface forming a part of said camera body and being inclined relative to the axis of said metering rod, said large diameter end of said conical spring element being anchored to said support surface, the inclination of said support surface being arranged to urge said free end of said metering rod toward said side of said metering slot from which said film advances, said support surface having a tapered slot accommodating said metering rod, opposite walls of said tapered slot forming said first and second stop means.

8. In a photographic camera mechanism for use with a roll film cartridge having a generally cylindrical film chamber, a generally cylindrical take-up chamber, a rotatable take-up spool in said take-up chamber, a cartridge body interconnecting said film and take-up chambers, a roll of film in said film chamber, said film having a leader portion extending through said cartridge body and into operative contact with said spool whereby rotation of said spool in one direction draws film from said roll and advances the same through said cartridge body and onto said spool, said spool having a plurality of exposed, radially extending, circumferentially spaced fins forming an integral part of said spool at one end thereof; a film winding mechanism comprising:

(a) a cylindrical knob;

(b) an annular projection extending from the bottom of said knob and having a diameter less than that of said knob thereby affording an annular surface on the bottom of said knob outside of the periphery of said annular projection, said annular surface having a plurality of circumferentially spaced arcuate slots each having an inclined top surface, said projection having a plurality of circumferentially spaced vertical slots each arranged to accommodate a respective one of said fins when said projection is inserted in said one end of said spool;

(c) an annular bead in the outer surface of said annular projection, said bead being vertically spaced from said bottom surface of said knob;

(d) a flat annular disk mounted on said annular projection and positioned against said bottom surface of said knob by contact with said bead, said disk having a plurality of inclined, circumferentially spaced projections in the upper surface thereof each arranged to enter a respective one of said arcuate slots and to contact the walls of said arcuate slots as a ratchet mechanism to prevent rotation of said knob and said spool except in said one direction; and (e) an elongated flat strip projecting from said disk and overlying the top surface of said cartridge when said projection is inserted in said one end of said spool, said strip having depending arms at each side thereof arranged to contact the sides of said cartridge to releasably retain said film winding mechanism on said cartridge body.

9. In a photographic camera having a front wall, a lens positioned in said front wall, an intermediate wall spaced from said front wall and having a light-admitting aperture aligned with said lens; a shutter mechanism comprising:

(a) a stud mounted on one of said walls and projecting into the space between said walls;

(b) a trip shutter blade having an elongated slot, said stud being accommodated in said elongated slot for guiding said trip shutter blade in a linear transverse path, relative to light entering said lens, between a rest position and a final position;

(c) a lower shutter blade pivotally mounted on said stud and pivotally movable about said stud in a plane parallel to the plane of said trip shuter blade from a rest position through an exposure position to a final position, said shutter blades having cooperating masking configurations arranged to prevent light entering said lens from reaching said window when said shutter blades are both in said rest and final positions thereof;

(d) externally operable means for moving said trip shuter blade from said rest to said final positions thereof;

(e) spring means interconnecting said shutter blades and urging said lower shutter blade to move between said rest and final positions thereof as said trip shutter blade moves between the corresponding positions thereof;

(f) cooperating means on said shutter blades to delay motion of said lower shutter blade from said rest position thereof until said upper shutter blade has moved at least a major portion of the distance from said rest to said final positions thereof, said lower shutter blade, when released, passing through said exposure position thereof, said masking configurations of said blades permitting light to pass from said lens to said aperture as said lower shutter blade passes from said rest through said exposure position thereof;

(g) a spring element coupled to said trip shutter blade and arranged to be tensioned as said trip shutter blade is moved from said rest to said final position thereof, said spring element returning said trip shutter blade and thereby also said lower shutter blade from said final to said rest positions thereof when said externally operable means is released; and (h) an inclined tab on one of side blades arranged to contact the other of said blades as said blades return to their rest positions thereof to prevent interlocking of said blades and to retain said lower shutter blade in said plane thereof.

References Cited by the Examiner

UNITED STATES PATENTS

| | | | |
|---|---|---|---|
| 920,901 | 5/1909 | Bander | 95—31 |
| 2,289,827 | 7/1942 | Crumrine | 95—31 |
| 2,367,195 | 1/1945 | Bolsey | 95—31 |
| 3,138,081 | 6/1964 | Nerwin | 95—31 |
| 3,138,084 | 6/1964 | Harvey | 95—31 |
| 3,148,605 | 9/1964 | Peterson et al. | 95—31 |

EVON C. BLUNK, *Primary Examiner.*